(12) United States Patent
Sheaffer et al.

(10) Patent No.: US 12,283,289 B2
(45) Date of Patent: Apr. 22, 2025

(54) SEPARATING AND RENDERING VOICE AND AMBIENCE SIGNALS BY OFFSETTING IMPACT OF DEVICE MOVEMENTS

(71) Applicant: Apple Inc., Cupertino, CA (US)

(72) Inventors: Jonathan D. Sheaffer, Santa Clara, CA (US); Joshua D. Atkins, Los Angeles, CA (US); Mehrez Souden, Los Angeles, CA (US); Symeon Delikaris Manias, Los Angeles, CA (US); Sean A. Ramprashad, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 551 days.

(21) Appl. No.: 17/514,694

(22) Filed: Oct. 29, 2021

(65) Prior Publication Data

US 2022/0059123 A1 Feb. 24, 2022

Related U.S. Application Data

(63) Continuation of application No. PCT/US2020/032273, filed on May 9, 2020.

(60) Provisional application No. 62/848,368, filed on May 15, 2019.

(51) Int. Cl.
| | | |
|---|---|---|
| *G10L 25/78* | (2013.01) | |
| *G06T 7/246* | (2017.01) | |
| *G10L 21/0272* | (2013.01) | |
| *H04R 3/00* | (2006.01) | |
| *H04R 25/00* | (2006.01) | |
| *H04S 1/00* | (2006.01) | |

(52) U.S. Cl.
CPC .............. *G10L 25/78* (2013.01); *G06T 7/248* (2017.01); *G10L 21/0272* (2013.01); *H04R 3/005* (2013.01)

(58) Field of Classification Search
CPC ............ H04R 25/00; G10L 25/78; H04S 1/00
See application file for complete search history.

(56) References Cited

U.S. PATENT DOCUMENTS

| | | |
|---|---|---|
| 9,445,174 B2 | 9/2016 | Virolainen |
| 9,712,936 B2 | 7/2017 | Peters |
| 9,933,989 B2 | 4/2018 | Tsingos et al. |

(Continued)

FOREIGN PATENT DOCUMENTS

| | | | |
|---|---|---|---|
| DK | 3477964 A1 * | 10/2018 | ............. H04R 25/00 |
| DK | 3477964 B1 * | 10/2018 | |

(Continued)

OTHER PUBLICATIONS

Luoting Fu, "Sound Rendering Technology and its Application in Virtual Environment", Computer Science, Engineering, Published 1999, 4 pages.

(Continued)

*Primary Examiner* — Farzad Kazeminezhad
(74) *Attorney, Agent, or Firm* — Aikin & Gallant, LLP

(57) ABSTRACT

Processing of ambience and speech can include extracting from audio signals, ambience and speech signals. One or more spatial parameters can be generated that define spatial characteristics of ambience sound in the one or more ambience audio signals. The primary speech signal, the one or more ambience audio signals, and the spatial parameters can be encoded into one or more encoded data streams. Other aspects are described and claimed.

16 Claims, 5 Drawing Sheets

(56) References Cited

U.S. PATENT DOCUMENTS

| | | |
|---|---|---|
| 2010/0241438 A1 | 9/2010 | Oh et al. |
| 2011/0178798 A1 | 7/2011 | Flaks et al. |
| 2013/0272527 A1 | 10/2013 | Oomen et al. |
| 2014/0247945 A1 | 9/2014 | Ramo et al. |
| 2015/0016641 A1 | 1/2015 | Ugur et al. |
| 2015/0223002 A1 | 8/2015 | Mehta et al. |
| 2015/0350804 A1 | 12/2015 | Crockett et al. |
| 2015/0373475 A1 | 12/2015 | Raghuvanshi et al. |
| 2016/0134988 A1 | 5/2016 | Gorzel et al. |
| 2016/0142854 A1 | 5/2016 | Fueg et al. |
| 2018/0005642 A1 | 1/2018 | Wang |
| 2018/0091920 A1 | 3/2018 | Family |
| 2018/0295463 A1 | 10/2018 | Eronen et al. |

FOREIGN PATENT DOCUMENTS

| | | | |
|---|---|---|---|
| EP | 2360681 | 8/2011 | |
| JP | 2010-541449 A | * 10/2008 | ............... H04S 1/00 |

OTHER PUBLICATIONS

Liu Hao, "Real-Time Multimedia Communication System Based on WebRTC Technology", Nanjing University of Science & Technology, 1994-2023, 68 pages.

Delikaris-Manias et al., "Parametric spatial audio recording and reproduction based on playback-setup-defined beamformers", received from https://www.researchgate.net/publication/308787346_Parametric_spatial_audio_recording_and_reproduction_based_on_playback-setup-defined_beamformers, Sep. 2016, 9 pages.

International Preliminary Report on Patentability for International Application No. PCT/US2020/032273 mailed Nov. 25, 2021, 10 pages.

International Search Report and Written Opinion for International Application No. PCT/US2020/032273 mailed Aug. 11, 2020, 30 pages.

"Spatial ambience and sound localization programs," Eastman Computer Music Center User's Guide, Section 7, Nov. 2012, 28 pages.

He, Jianjun, "Spatial Audio Reproduction Using Primary Ambient Extraction," Dissertation submitted to the Nanyang Technological University, School of Electrical & Electronic Engineering, 2016, 247 pages.

* cited by examiner

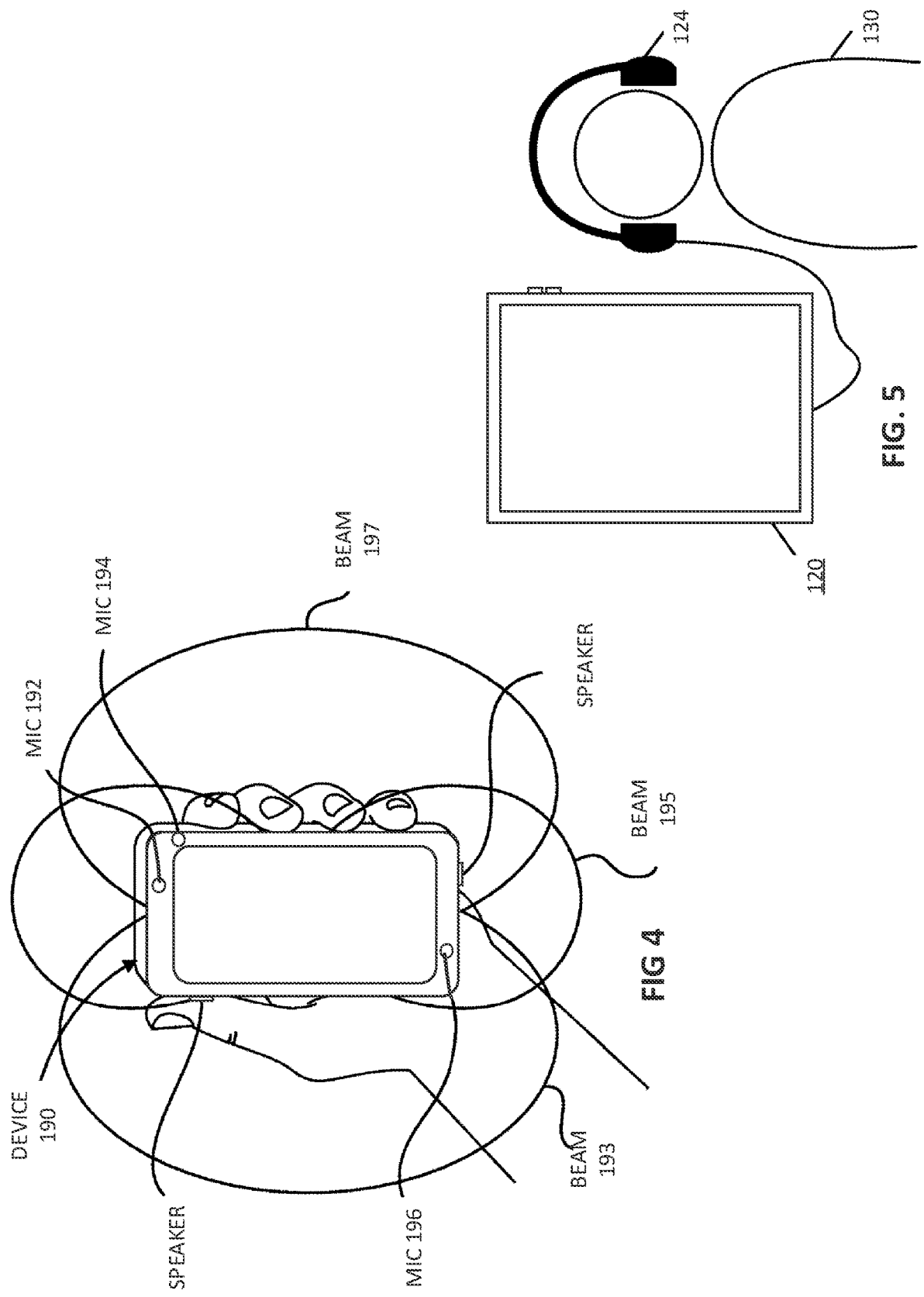

SEPARATING AND RENDERING VOICE AND AMBIENCE SIGNALS BY OFFSETTING IMPACT OF DEVICE MOVEMENTS

This application is a continuation of International Application No. PCT/US2020/032273 filed May 9, 2020, which claims priority to U.S. Provisional Application No. 62/848,368 filed May 15, 2019.

FIELD

One aspect of the disclosure herein relates to separating and rendering voice and ambience signals.

BACKGROUND

Microphone arrays, which can be embedded in consumer electronic devices (for example, a mobile phone or tablet), can facilitate a means for capturing and rendering spatial (3D) sound. The microphone signals of a microphone audio (also referred to here as multi-channel sound pickup) capture a 3D sound scene. 3D audio rendering can be described as the processing of an audio signal (such as a microphone signal or other recorded audio content) so as to yield sound produced by stereo speakers, surround-sound speakers, speaker arrays, or headphones that is perceived by the listener as coming from a particular direction or all around the listener in three-dimensional space. For example, one or more of such virtual sound sources can be generated in a sound program that will be perceived by a listener to be behind, above or below the listener, or panned from one side of the listener to another.

SUMMARY

One or more microphone arrays in a sound field can capture audio signals that can be used to create an immersive audio environment for a listener. In some scenarios, for example, during a videochat, a primary speaker may be of particular interest to a listener. Ambience sounds, for example, sounds in the sound field other than that of the primary speaker, can provide an immersive environment for the listener when played back. Ambience, however, can also distract and detract from the primary speaker. Thus, it may be beneficial to separate or disassociate the ambience sounds from the speech of the primary speaker. In such a case, the speech and ambience can be processed and rendered in manners according to the present disclosure that increase the intelligibility of the speech while making the ambience sound more crisp and recognizable, yet detached from the primary speaker in a spatially distant manner. The listener can hear the primary speaker's speech as being distinct from the ambience, but still experience an immersive spatial playback of the captured sound field.

When a user records audio and/or video with a capture device having microphones, including live streaming audio/video to a listener, the orientation or location of the capture device can change due to movements of the user, for example when the user is wearing or holding the device. In such a case, ambience sounds around the user capturing the audio may appear to change direction or move to the listener listening to the audio, due to relative position changes between the capture device and the ambience sounds. This can be distracting and disorienting to a listener. Thus, in one aspect, it may be beneficial to process the sound so that the ambience sounds do not move in a distracting or disorienting manner.

When a listener plays the audio and/or video, for example, through a receiving device, a preference for a rendering of ambience may vary among different listeners. Furthermore, cues in the playback environment may be detected to automatically modify playback of ambience, thereby improving the experience of the listener. In some aspects, the playback of ambience sounds are addressed in the present disclosure.

In one aspect, a method performed by a processor of a device having a plurality of microphones, includes: receiving a plurality of audio signals from the plurality of microphones, the plurality of microphones capturing a sound field; processing the audio signals into a plurality of frequency domain signals; extracting, from the frequency domain signals, a primary speech signal; extracting, from the frequency domain signals, one or more ambience audio signals; generating one or more spatial parameters defining spatial characteristics of ambience sound in the one or more ambience audio signals; and encoding the primary speech signal, the one or more ambience audio signals, and the spatial parameters into one or more encoded data streams. The encoded data can be used by a playback device for a spatial audio experience.

In one aspect, a method performed by a playback device, for playback of sound captured by a capture device, includes: receiving one or more encoded data streams; decoding the one or more encoded data streams to extract a primary speech signal, one or more ambience audio signals, and spatial parameters of the one or more ambience audio signals; determining, based on the spatial parameters, one or more impulse responses; and convolving each of the one or more ambience audio signals with the one or more impulse responses resulting in spatialized ambience audio signals; processing the spatialized ambience audio signals and the primary speech signal to produce a plurality of time domain channel signals; and driving a plurality of speakers based on the plurality of time domain channel signals.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below and particularly pointed out in the Claims section. Such combinations may have particular advantages not specifically recited in the above summary.

BRIEF DESCRIPTION OF THE DRAWINGS

Several aspects of the disclosure here are illustrated by way of example and not by way of limitation in the figures of the accompanying drawings in which like references indicate similar elements. It should be noted that references to "an" or "one" aspect in this disclosure are not necessarily to the same aspect, and they mean at least one. Also, in the interest of conciseness and reducing the total number of figures, a given figure may be used to illustrate the features of more than one aspect of the disclosure, and not all elements in the figure may be required for a given aspect.

FIG. 4 illustrates a mobile device having a microphone array that forms pickup beams, according to one aspect.

FIG. 5 illustrates a mobile device and a headset, according to one aspect.

DETAILED DESCRIPTION

Several aspects of the disclosure with reference to the appended drawings are now explained. Whenever the shapes, relative positions and other aspects of the parts described are not explicitly defined, the scope of the invention is not limited only to the parts shown, which are meant merely for the purpose of illustration. Also, while numerous details are set forth, it is understood that some aspects of the disclosure may be practiced without these details. In other instances, well-known circuits, structures, and techniques have not been shown in detail so as not to obscure the understanding of this description.

Figure 1:
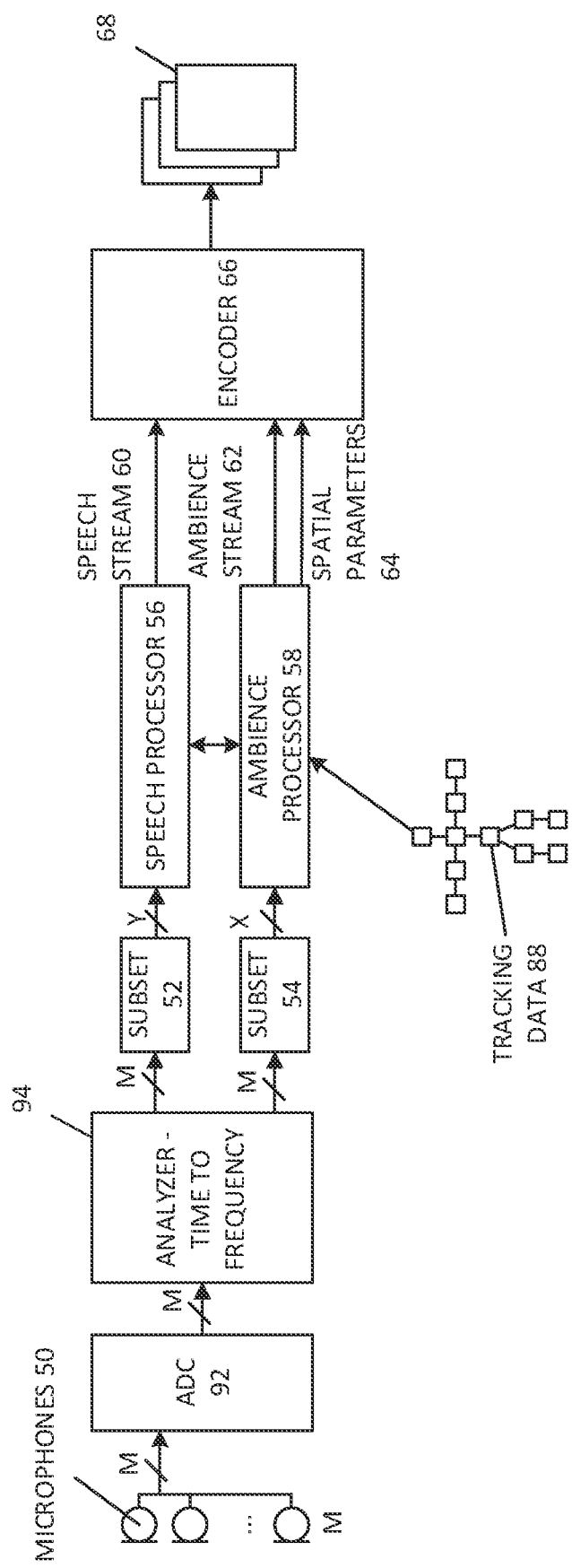
FIG. 1 illustrates a diagram of a system or device that processes speech and ambience, according to one aspect.

Referring now to FIG. 1, a system 2 is shown relating to processing of speech and ambience. The system can be a capture device. The system (which can take the form of a device or article of manufacture) can be, for example, a laptop computer, a desktop computer, a mobile phone, a smart phone, a tablet computer, a smart speaker, a headset or an infotainment system for an automobile or other vehicle, or combinations thereof.

Microphones

In one aspect, the system can receive a plurality of M audio signals from a plurality of M microphones 50, the plurality of microphones capturing a sound field. Analog to digital converters 92 can convert the audio signals from their analog form to digital form. An analyzer 94 can convert the M signals into M original frequency domain signals 94 (e.g., using Fourier analysis techniques). In one aspect, a beam analyzer or beam former (not shown) can produce a number of acoustic pickup beams from the frequency domain audio signals to be selected by subset modules 52 and 54.

Subset Modules

The subset module 52 can select a channel having a primary speaker based on, for example, blind signal separation (also known as blind source separation). In one aspect, blind signal separation is used to identify speech from one or more speakers in a sound field. If multiple speakers are present, then a channel can be selected based on different factors. In one aspect, given a known arrangement of microphones of a recording device, an audio signal can be selected in the direction that a camera is also pointed at. In such a case, an assumption may be made that the primary speaker is located in front of the camera so that video and audio of the speaker is processed simultaneously. In one aspect, the channel (or beamformed or separated signal) is selected based on a highest signal to noise ratio (SNR), the higher SNR ratio indicating that the channel contains predominantly speech. In another aspect, the channel or beamformed signal (beam) or separated stream is selected based on the audio content (such as focusing on speech and disregarding background noise).

Similarly, a subset module 54 can select a subset of the frequency domain signals to be processed by an ambience processor 58. The microphone signals can be selected based on SNR (e.g., below a threshold SNR) or other indicators that might indicate that the signals contain ambience sounds. Ambience sounds can include sounds other than a primary voice, including directional sound sources, diffuse sounds, and localized sounds (e.g., sounds having a location). Subset module 54 can be optional, e.g., all audio signals M can be selected to be processed by ambience processor 58.

In one aspect, a beamformer can generate pickup beams from the M analyzed audio signals and the subset modules can select X and/or Y pickup beams. For example, FIG. 4 shows a device 190 having with microphones 192, 194, and 196. Audio signals from these microphones can be combined in different combinations by a beamformer to generate, e.g., pickup beams 193, 195 and 197. In another aspect, a source separation algorithm can generate multiple separated audio signals.

Referring back to FIG. 1, subset modules 52 and 54 can select signals to be processed by the speech processor 56 and ambience processor 58. As shown in other aspects of this disclosure, the subset modules can be performed after speech has been extracted, rather than prior (see, e.g., FIG. 3).

Speech Processor

Speech processor 56 can extract, from the M frequency domain signals, a primary speech signal. In one aspect, speech processor 56 can include a single channel dereverberator, a single channel denoiser, a multi-channel dereverberator, a multi-channel denoiser such as a parametric multi-channel Wiener filter (PMWF), multi-channel linear prediction module, or combinations thereof. The speech processor 56 can generate a speech stream (or speech data) 60 having the clean voice signal. The speech processor can also include a voice activity detector, a beamformer with a beam tuned to an assumed direction of the primary speaker, a family of beamformers with beams tuned to two or more assumed direction of the primary speaker.

Ambience Processor

Ambience processor 58 can extract, from the frequency domain signals, one or more ambience audio signals, perform localization on the audio signals, and generate one or more spatial parameters defining spatial characteristics of ambience sound in the one or more ambience audio signals.

Figure 3:
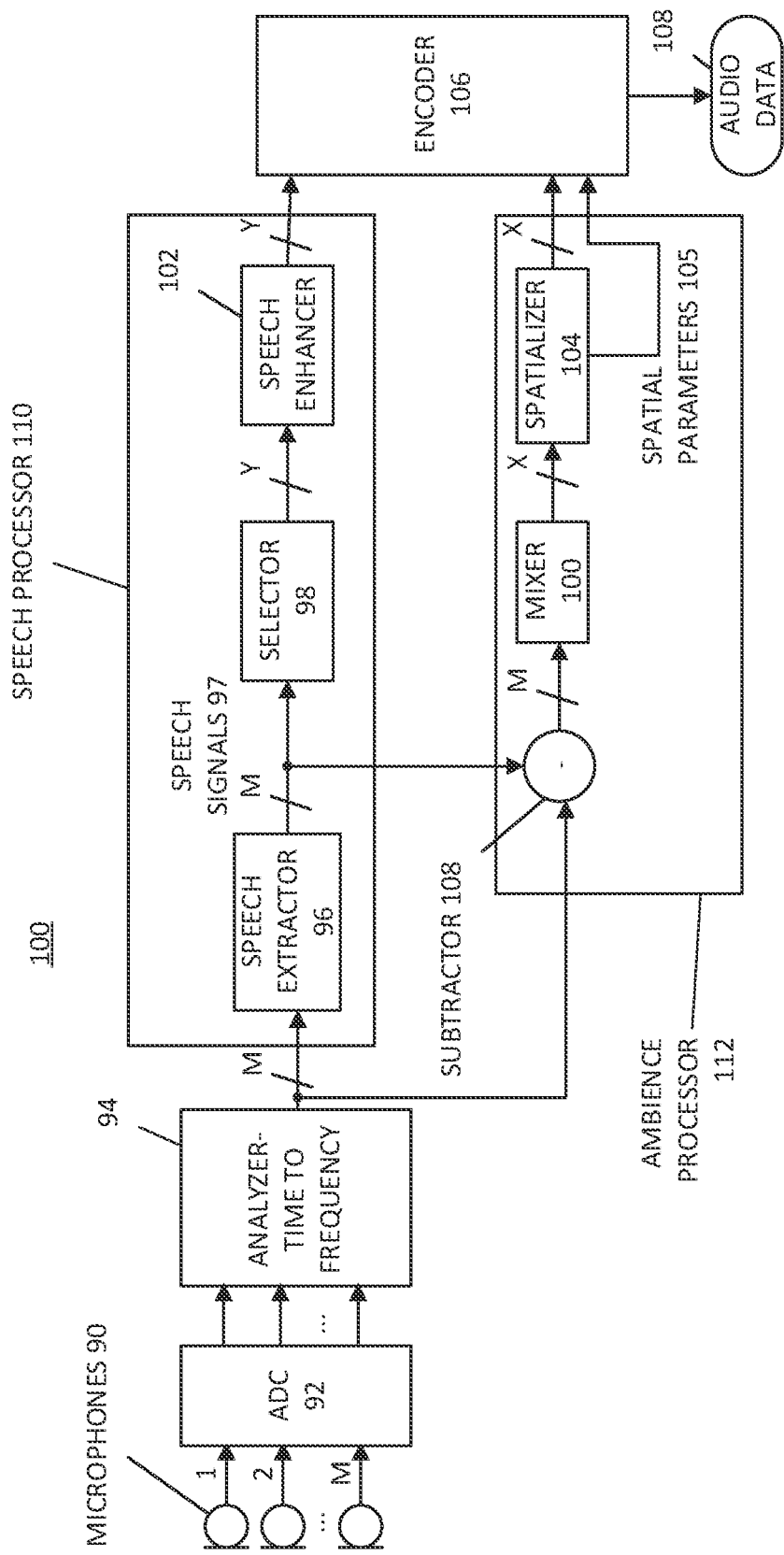
FIG. 3 illustrates a diagram of a system or device that processes speech and ambience, according to one aspect.

The ambience processor 58 can receive a subset X audio signals of the M audio signals. In one aspect, the subset X can be the entire set of M audio signals. The ambience processor can extract the ambience sounds from the X audio signals. In one aspect, this can be performed by subtracting the speech component from the X audio signals, as shown in FIG. 3. This is described in another section. In one aspect, sound sources are extracted from the selected audio signals and localized based on the difference of arrival times, phase, and/or levels of a sound at multiple microphones. Clearly defined sources can be separated from background sounds that are diffuse and less clearly defined in nature. Examples of localization techniques include the maximum likelihood method to calculate the direction, range and depth of the sound source, an artificial neural network approach, or a beamforming method that maximizes the output energy of a delay and sum beamformer to find the maximum output value of a beamformer steered in all possible directions.

The ambience processor can generate spatial parameters 64 that define spatial characteristics of ambience sound. Ambience sounds can include localized sounds having direction and/or position in the sound field, and/or diffuse (scattered) sounds without position. The spatial parameters 64 can include one or more virtual locations of corresponding ambience sounds, a directionality of ambience sounds, and/or a loudness level of the ambience sounds. Ambience stream 62 can be mixed into a defined channel output format (e.g., stereo, 5.1, 6.1) or encoded as object-based audio (OBA) with the spatial parameters. The spatial parameters can be encoded as metadata or as OBA.

Tracking Data

In one aspect, the one or more spatial parameters 64 can be modified based on tracking data 88 (e.g., a location or orientation of the device). In one aspect, the spatial parameters are modified with the tracking data by offsetting a relative movement or change in position/location of an ambience sound, the relative movement caused by a change in the location or orientation of the device, to maintain a constant (or substantially constant) virtual spatial location of the ambience sound during playback. The relative changes in virtual location or direction caused by the movement of the capturing device can thus be removed so that the ambience sound sources appear unchanged to the listener, thereby removing unwanted distractions.

In one aspect, the tracking data is generated based on one or more sensors such as a camera, a microphone array, a gyroscope, an accelerometer, and a GPS receiver. In one aspect, the one or more sensors and microphones 50 are integral to the same device.

In one aspect, tracking data is generated based on images captured by a camera. For example, a tracking processor can compare a first image with second image generated by a camera and determine a change in location or orientation/rotation of the capturing device based an object of interest or pattern, detected in both images. For example, if the object of interest or pattern moves from a first location of the first image to a second location in the second image, a rotation of the capture device can be estimated or calculated. Similarly, if an object of interest or pattern changes in size, then a change in distance between the capture device and object can be estimated or calculated. Objects of interest or patterns can be recognized, for example, with computer vision, object recognition, and other techniques. Various techniques can be used based on images captured by a camera to track positional information of a capture device in the physical environment of the capture device.

In one aspect, the tracking data can be generated based on estimation of sound source locations (e.g., ambience sounds) in the sound field, and detected changes in the sound source locations in the sound field, indicating a change in the location or orientation of the device. Thus, the detected change in location or orientation can be used based on the microphone array of the capturing device, generating audio signals with the sounds used for sound source estimation. In one aspect, the localization data of the ambience sounds is used for tracking data as well as spatialization.

In one aspect, rather than modify the spatial parameters at the encoding side, the tracking data (e.g., location and/or orientation of the recording device) can be encoded in the data 68 to be used by the playback device to modify the spatial parameters. This can beneficially allow the playback device or a user at the playback device to select whether or not to remove movement in ambience sounds caused by movements of the capture device.

In one aspect, a primary speech signal is encoded in speech stream 60 without spatial parameters to be played by a playback device without spatialization (e.g., directly or 'in head' of the listener). Thus, the speech can be heard by the listener to be direct into the ears, while ambience sounds are spatialized, providing an immersive audio environment while still maintaining a clear communication channel between the speech and the listener. In one aspect, where multiple sources of speech are detected in the audio signals, the primary speech signal can be identified as being primary based on a detected location of a speaker (a person speaking) relative to the device. For example, the primary speech can be deemed as primary if it is located in front of the device (e.g., a smart phone or tablet computer). The location of the primary speech signal can also be based on speech that emanates from a line of sight of a camera of the capture device, the assumption here being that things in the line of sight of the camera are of interest, and things of interest and speaking might be the primary speaker. In one aspect, primary speech can be identified by a voice activity detector. The voice activity detector can use include one or more of the following components: Machine Learning (DNNs), accelerometers, cameras.

In one aspect, only ambience sounds that are within a field of vision of a camera of the capture device are spatialized. In this manner, ambience that the listener can see (e.g., played back as a video stream on a display of a playback device) is spatialized and ambience that is outside the field of vision of the camera, which the listener cannot see, is not spatialized. The listener is thereby immersed in the physical environment of the capture device.

Encoder

An encoder 66 can encode the primary speech signal, the one or more ambience audio signals, and the spatial parameters into one or more encoded data or data streams 68. The data stream can be part of an audiovisual data stream (e.g., a video stream). In one aspect, the encoded audio or audiovisual data can be encoded as a datastream in real-time (e.g., encoding concurrent with the capture and/or processing of the audio signals from microphones 50). The datastream can be communicated to a decoder in real-time, to be played back in real-time. In one aspect, each ambience sound source or diffuse sound can be encoded into the ambience stream 62 as defined channel data (e.g., stereo, 5.1, 6.1) or an object-based representation of an ambience sound.

Figure 2:
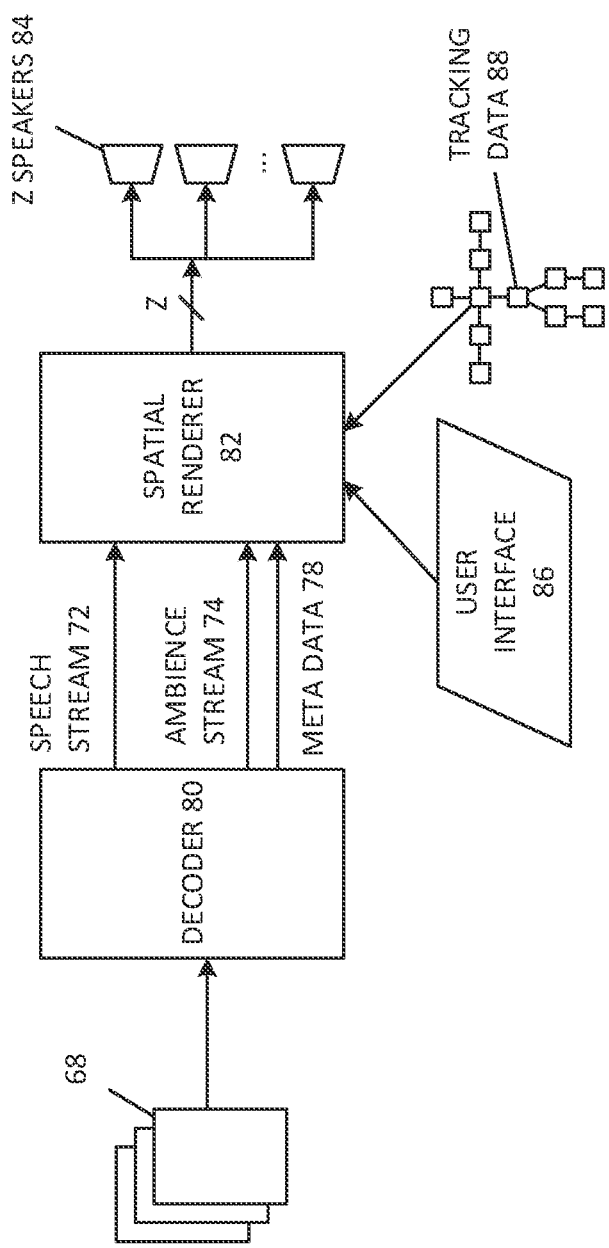
FIG. 2 illustrates a diagram of a system or device that renders and plays back speech and ambience, according to one aspect.

In one aspect, the data 68 is transmitted, through a network, to be played back by a receiving device 3, as shown in FIG. 2. In one aspect, encoded data stream 68 can be transmitted in real-time, to a playback device, wherein the encoded data streams further includes a stream of images in sync with the primary speech signal and the ambience audio signals. This can provide a real-time conversation between users where one user is capturing and speaking and the other user is listening to the speaker and experiencing the ambience sounds, almost as it occurs.

Playback

Referring now to FIG. 2, a system 3 is shown relating to playback of speech and spatialized ambience. The system (which can take the form of a device or article of manufacture) can be, for example, a laptop computer, a desktop computer, a mobile phone, a smart phone, a tablet computer, a smart speaker, a headset or an infotainment system for an automobile or other vehicle. In one aspect, the system can be a combination of devices, for example, the playback system can include a mobile device with a display that plays video and a headset that plays the corresponding audio.

In one aspect, a playback device can receive encoded data 68 (e.g., a datastream or live datastream). A decoder 68 can decode the data to extract a speech stream 72 having a primary speech signal, an ambience stream 74 having one or more ambience sounds encoded as objects or signals, and metadata 78 having spatial parameters of the one or more ambience sounds. The speech stream can be a digital bitstream that contains one or more audio signals having data representing speech. Similarly, the ambience stream can be a digital bitstream that contains or more audio signals having data representing ambience sounds.

A spatial renderer 82 having a spatial engine can process the primary speech signal and the one or more ambience audio signals based on the spatial parameters to produce a plurality of time domain channel signals, wherein the one or more ambience audio signals are spatialized in the plurality of time domain channel signals 7. For example, the spatial renderer can determine, based on the spatial parameters, one or more impulse responses. The impulse responses (e.g., head related impulse response, binaural response impulse response of left and right ear) can be selected from a database, or synthesized based on models of heads, pinnae, and upper bodies. Locational data can be encoded as parameters into the impulse responses or transfer functions derived from the impulse responses. The spatializer can convolve each of the one or more ambience audio signals with the one or more impulse responses resulting in spatialized ambience audio signals. The spatialized ambience audio signals and the primary speech signal can be processed (e.g., inverse Fourier analysis) to produce a plurality of time domain channel signals. The playback device can drive a plurality of speakers 84 based on the plurality of time domain channel signals.

In one aspect, the renderer can select an appropriate rendering of the ambience and/or the clean voice signal based on factors including a) ratio of speech to noise level, b) the content of the data, c) the noise environment of the renderer, or d) user input (e.g., a slider to adjust the ambience level). As a specific example, if the noise environment of the render is such that the user is already immersed in a very high noise level, the system may decide automatically to reduce significantly or not play at all the ambience stream.

In one aspect, the spatial parameters of the one or more ambience audio signals are modified based on tracking data received in and decoded from the encoded data stream 68, the tracking data including a location or orientation of the capture device. In one aspect, the spatial parameters of the one or more ambience audio signals are modified with the tracking data by offsetting a relative movement of an ambience sound source caused by a change in the location or orientation of the capture device, to maintain a virtual spatial location of the ambience sound source during playback. Movement of the capture device that can cause unwanted spatial changes in the ambience sounds can be offset or removed by the playback device.

In one aspect, a playback level (or other characteristics, e.g., directionality) of the one or more ambience audio signals (or objects) are defined and/or modified based on a user input. The user input can be received through a graphical user interface (e.g., a slider on a touch screen). Additionally or alternatively, the playback level of the one or more ambience audio signals can be automatically adjusted and/or generated based on a) a speech to noise ratio, b) a content type, or c) a detected noise in the playback environment.

In one aspect, speech in speech stream 72 (e.g., a primary speech signal) is played directly through the plurality of speakers without spatialization. In this manner, the system can spatialize the ambience but play back a speech signal directly to a listener. This can provide an immersive experience while, at the same time, differentiating between ambience sounds and the primary speech spatially and thereby making the speech more intelligible. The primary speech can also be enhanced, which further adds to intelligibility of the speech.

In one aspect, a first user can have a capture device that captures sound in the physical environment, processes it, and transmits it to a second user. Concurrently, the second user can have a capture device that also captures sound in the physical environment of the second user, and transmits it to the first user. Both capture devices can also concurrently process the received data and playback the data, for example, in a video conference or chat scenario.

System with Speech Enhancement

In one aspect of this disclosure a system 100 for processing ambience and speech is shown in FIG. 3. System 100 can be a capture device. Such a system can include one or more microphones 90 that generate M audio signals, the signals capturing sounds (e.g., speech and ambience) in a sound field. Analog to digital converters 92 can convert each analog audio signal to a digital audio signal. An analyzer 94 can convert each signal to M frequency domain signals (e.g., using Fourier analysis, short time Fourier transform, discrete Fourier transform, or other techniques).

A speech processor 110 can include a speech extractor 96 that can remove reverberant and/or diffuse components from the frequency domain signals. The speech extractor 96 can include, for example, a parametric multi-channel Wiener filter (PMWF) or a multi-channel dereverberator. The output of the speech extractor can be M signals 97 having clean speech components. A selector or subset module 98 can select one or more audio signals from signals 97 that best capture the clean speech and other desired signals in the scene. This can be done, for example, based on SNR or blind signal separation, and/or a voice activity detector and/or one or more assumed desired speaker directions as previously discussed. In one aspect, a beamformer can generate pickup beams based on signals 97 and the selector can select the pickup beam that best captures the clean speech. In one aspect, the best beam is selected based on information from a voice activity detector. In one aspect, the selector can select Y signals or beams. In one aspect, the selector can select a single signal or beam. In one aspect, an optional speech enhancer 102 can improve speech quality of the selected speech signal (e.g. improving the intelligibility) of the speech signal using speech enhancement techniques. Speech enhancement can include equalization of the speech signal, and/or formant shaping.

In one aspect, an ambience processor 112 can include a subtractor 108 to subtract from the original frequency domain signals, the primary speech component in speech signals 97. In one aspect, the subtractor uses a fixed complex scaling of the primary speech, the complex scaling being frequency and ambience channel dependent, followed by a subtraction of this scaled stream from the raw ambience channel. In one aspect, the complex scaling is adaptively estimated, for example though a criteria that minimize the resulting signal energy after subtraction. Well known adaptive algorithms such as the Least Mean Square (LMS) algorithm can be used. The output of the subtractor can be M audio signals containing only ambience sounds (e.g., sounds other than the primary speech). This can include diffuse sounds and spatially localized sound sources (e.g., birds chirping and non-primary speech). A mixer 100 can mix the M audio signals containing ambience sounds into X channels, as defined in an output format (e.g., stereo, 5.1, 7.1, etc.). A spatializer 104 can localize ambience sounds in the channels X and generate corresponding spatial parameters 105 (e.g., direction and/or position of ambience sounds). Although not shown, tracking data can optionally be used by the spatializer to offset movements of the capture device, as described in other sections.

The encoder 106 can encode the speech signals Y, ambience signals X and spatial parameters into output data 108 that can be processed and played back by a playback device. The spatial parameters can be encoded as metadata and the speech signals Y and ambience signals X can be encoded as audio streams in respective channels.

In one aspect, the audio/sound information of the clean speech and the ambience are encoded as an OBA (e.g., sounds and/or sound sources are encoded as objects having direction and/or position in an audio scene).

Speech Spatially Tracks during Playback

In one aspect, a method performed by a playback device, includes: receiving an encoded data stream having audio and visual data; decoding the encoded data stream to extract a primary speech signal and one or more ambience audio signals; modifying a spatial parameter of the primary speech signal based on tracking data that defines a location or orientation of the playback device, the spatial parameter defining a virtual location or orientation of the primary speech signal, so that a virtual location or orientation of the primary speech signal follows the tracked location or orientation of the playback device. In one aspect, the method can further include: determining, based on the spatial parameter, one or more impulse responses; convolving the primary speech signal with the one or more impulse responses resulting in spatialized primary speech; processing the ambience audio signals and the spatialized primary speech signal to produce a plurality of time domain channel signals; driving headset speakers based on the plurality of time domain channel signals; and driving a display with the visual data. In one aspect, the playback device can receive spatial parameters of the one or more ambience audio signals, as described in other sections. Thus, the method can spatialize ambience to match the environment of the capture device, but spatialize the primary speech to follow the position of the playback device.

For example, as shown in FIG. 5, the audiovisual stream of a video call can be played back to a listener 130 wearing a headset 124 and holding a phone/tablet 120. Images of the primary speaker can be shown through display 122. The primary speech can be spatialized such that when the phone or tablet moves around, the virtual location of the primary speaker, which is played back through the headset, can be modified to follow the physical location of the phone or tablet in which the speaker is being displayed. Meanwhile, the ambience sounds sources are spatialized in a manner so as not to distract the listener from the primary speech. This can provide an immersive experience.

Figure 6:
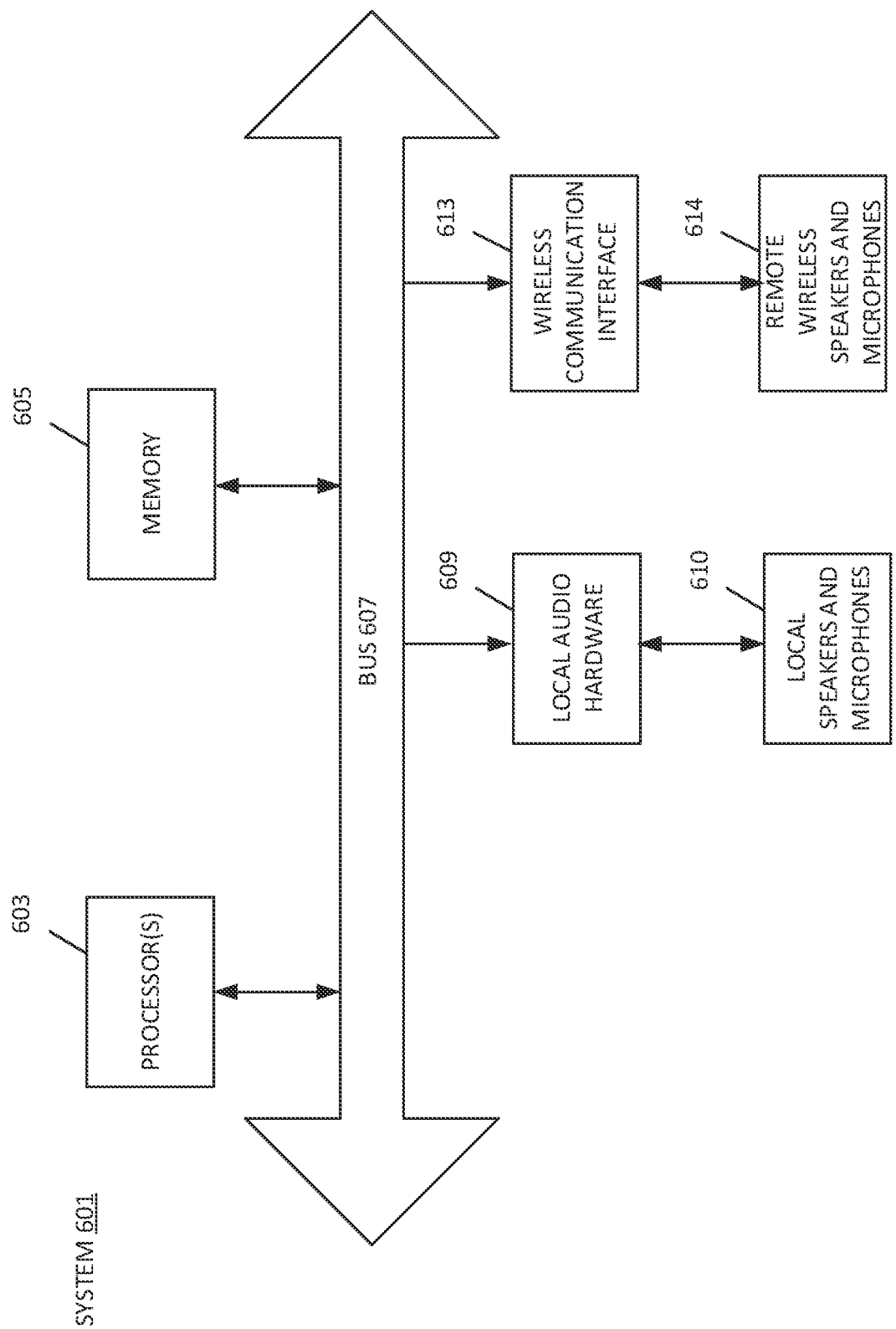
FIG. 6 illustrates an audio processing system, according to one aspect.

FIG. 6 shows a block diagram for explaining an example of an audio processing system hardware which may be used with any of the aspects described herein. This audio processing system can represent a general purpose computer system or a special purpose computer system. Note that while FIG. 6 illustrates the various components of an audio processing system that may be incorporated into headphones, speaker systems, microphone arrays and entertainment systems, it is merely one example of a particular implementation and is merely to illustrate the types of components that may be present in the audio processing system. FIG. 6 is not intended to represent any particular architecture or manner of interconnecting the components as such details are not germane to the aspects herein. It will also be appreciated that other types of audio processing systems that have fewer components than shown or more components than shown in FIG. 6 can also be used. Accordingly, the processes described herein are not limited to use with the hardware and software of FIG. 6.

As shown in FIG. 6, the audio processing system 601 (for example, a laptop computer, a desktop computer, a mobile phone, a smart phone, a tablet computer, a smart speaker, or an infotainment system for an automobile or other vehicle) includes one or more buses 607 that serve to interconnect the various components of the system. One or more processors 603 are coupled to bus 607 as is known in the art. The processor(s) may be microprocessors or special purpose processors, system on chip (SOC), a central processing unit, a graphics processing unit, a processor created through an Application Specific Integrated Circuit (ASIC), or combinations thereof. Memory 605 can include Read Only Memory (ROM), volatile memory, and non-volatile memory, or combinations thereof, coupled to the bus 607 using techniques known in the art.

Memory can include DRAM, a hard disk drive or a flash memory or a magnetic optical drive or magnetic memory or an optical drive or other types of memory systems that maintain data even after power is removed from the system. In one aspect, the processor 603 retrieves computer program instructions stored in a machine readable storage medium (memory) and executes those instructions to perform operations described herein.

Local audio hardware 609 is coupled to the one or more buses 607 in order to receive audio signals to be processed and output by local speakers 610. Local audio hardware 609 can comprise digital to analog and/or analog to digital converters. Local hardware 609 can also include audio amplifiers and filters. The Local audio hardware can also interface with local microphones (e.g., microphone arrays) to receive audio signals (whether analog or digital), digitize them if necessary, and communicate the signals to the bus 607. Local microphones and local speakers can be located in the same housing as the system 601, for example, they can be speakers in a mobile phone, tablet, smart speaker, or other forms that system 601 can take.

Wireless communication interface 613 can communicate with remote devices and networks. For example, wireless communication interface 613 can communicate over known technologies such as Wi-Fi, 3G, 4G, 5G, Bluetooth, ZigBee, or other equivalent technologies. Wireless communication interface 613 can communicate (e.g., receive and transmit data) with networked devices such as servers (e.g., the cloud) and/or other devices such as remote wireless speakers and microphones 614. Remote speakers and microphones can also be connected be integrated into system 601 through wired connections, as known in the art.

It will be appreciated that the aspects disclosed herein can utilize memory that is remote from the system, such as a network storage device which is coupled to the audio processing system through a network interface such as a modem or Ethernet interface. The buses 607 can be connected to each other through various bridges, controllers and/or adapters as is well known in the art. In one aspect, one or more network device(s) can be coupled to the bus 607. The network device(s) can be wired network devices (e.g., Ethernet) or wireless network devices (e.g., WI-FI, Bluetooth).

Various aspects descried herein may be embodied, at least in part, in software. That is, the techniques may be carried out in an audio processing system in response to its processor executing a sequence of instructions contained in a storage medium, such as a non-transitory machine-readable storage medium (e.g. DRAM or flash memory). In various aspects, hardwired circuitry may be used in combination with software instructions to implement the techniques described herein. Thus the techniques are not limited to any specific combination of hardware circuitry and software, or to any particular source for the instructions executed by the audio processing system.

In the description, certain terminology is used to describe features of various aspects. For example, in certain situations, the terms "analyzer", "extractor", "renderer", "estimator", "combiner", "processor", "synthesizer", "component," "unit," "module," and "logic" are representative of hardware and/or software configured to perform one or more functions. For instance, examples of "hardware" include, but are not limited or restricted to an integrated circuit such as a processor (e.g., a digital signal processor, microprocessor, application specific integrated circuit, a micro-controller, etc.). Of course, the hardware may be alternatively implemented as a finite state machine or even combinatorial logic. An example of "software" includes executable code in the form of an application, an applet, a routine or even a series of instructions. As mentioned above, the software may be stored in any type of machine-readable medium.

Some portions of the preceding detailed descriptions have been presented in terms of algorithms and symbolic representations of operations on data bits within a computer memory. These algorithmic descriptions and representations are the ways used by those skilled in the audio processing arts to most effectively convey the substance of their work to others skilled in the art. An algorithm is here, and generally, conceived to be a self-consistent sequence of operations leading to a desired result. The operations are those requiring physical manipulations of physical quantities. It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilising terms such as those set forth in the claims below, refer to the action and processes of an audio processing system, or similar electronic device, that manipulates and transforms data represented as physical (electronic) quantities within the system's registers and memories into other data similarly represented as physical quantities within the system memories or registers or other such information storage, transmission or display devices.

The processes and blocks described herein are not limited to the specific examples described and are not limited to the specific orders used as examples herein. Rather, any of the processing blocks may be re-ordered, combined or removed, performed in parallel or in serial, as necessary, to achieve the results set forth above. The processing blocks associated with implementing the audio processing system may be performed by one or more programmable processors executing one or more computer programs stored on a non-transitory computer readable storage medium to perform the functions of the system. All or part of the audio processing system may be implemented as, special purpose logic circuitry (e.g., an FPGA (field-programmable gate array) and/or an ASIC (application-specific integrated circuit)). All or part of the audio system may be implemented using electronic hardware circuitry that include electronic devices such as, for example, at least one of a processor, a memory, a programmable logic device or a logic gate. Further, processes can be implemented in any combination hardware devices and software components.

While certain aspects have been described and shown in the accompanying drawings, it is to be understood that such aspects are merely illustrative of and not restrictive on the broad invention, and the invention is not limited to the specific constructions and arrangements shown and described, since various other modifications may occur to those of ordinary skill in the art. The description is thus to be regarded as illustrative instead of limiting.

For example, while FIG. 1 depicts a system or device in which subsets 52 and 54 select audio signals as inputs into processors 56 and 58, it is possible to include such subset modules as integral to speech processors and ambience processors as shown in FIG. 3. In addition, subset module 54 can be optional, meaning that all audio signals can be used for ambience, while audio signals are selected for speech.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What is claimed is:

1. A method performed by a processor of a device having a plurality of microphones, comprising:
receiving a plurality of audio signals from the plurality of microphones, the plurality of microphones capturing a sound field;
processing the audio signals into a plurality of frequency domain signals;
extracting, from the frequency domain signals, a primary speech signal;
extracting, from the frequency domain signals, one or more ambience audio signals;
generating one or more spatial parameters defining spatial characteristics of an ambience sound in the one or more ambience audio signals, the one or more spatial parameters include a location of an ambience sound source;
detecting a location or an orientation of the device, as tracking data;
modifying the one or more spatial parameters based on the tracking data by offsetting a relative movement of the ambience sound source, the relative movement caused by a change in the location or orientation of the device, to maintain a location of the ambience sound source constant during playback; and
encoding the primary speech signal, the one or more ambience audio signals, and the as modified spatial parameters into one or more encoded data streams.

2. The method of claim 1, wherein the tracking data is generated based on one or more sensors, the sensors including one or more of the following: a camera, a set of microphones, a gyroscope, an accelerometer, and a GPS receiver.

3. The method of claim 1, wherein the tracking data is generated based on images captured by a camera, including comparing a first image with a second image and determining a change in the location or orientation of the device based on the comparison.

4. The method of claim 1, wherein the tracking data is generated based on estimation of sound source locations in the sound field, and detected changes in the sound source locations in the sound field, indicating a change in the location or orientation of the device.

5. The method of claim 1, further comprising encoding the tracking data in the encoded data streams.

6. The method of claim 1, wherein the primary speech signal is encoded without corresponding spatial parameters and is to be played back by a playback device without spatialization.

7. The method of claim 1, wherein the primary speech signal is identified as being the primary speech signal based on a detected location of a speaker relative to the device.

8. The method of claim 1, further comprising transmitting the encoded data streams in real-time, to a playback device, wherein the encoded data streams further includes a stream of images in sync with the primary speech signal and the ambience audio signals.

9. A method performed by a playback device, for playback of sound captured by a capture device, comprising:
  receiving from the capture device one or more encoded data streams;
  decoding the one or more encoded data streams to extract a primary speech signal, one or more ambience audio signals representing an ambience sound source, and one or more spatial parameters of the one or more ambience audio signals wherein the one or more spatial parameters include a location of the ambience sound source;
  modifying the one or more spatial parameters of the one or more ambience audio signals based on tracking data received in and decoded from the one or more encoded data streams, the tracking data including a location or orientation of the capture device, by offsetting a relative movement of the ambience sound source caused by a change in the location or orientation of the capture device, to maintain a location of the ambience sound source constant during playback in the playback device;
  determining, based on the one or more spatial parameters, one or more impulse responses;
  convolving each of the one or more ambience audio signals with the one or more impulse responses resulting in spatialized ambience audio signals;
  processing the spatialized ambience audio signals and the primary speech signal to produce a plurality of time domain channel signals; and
  driving a plurality of speakers based on the plurality of time domain channel signals.

10. The method of claim 9, further comprising defining or modifying a playback level of the one or more ambience audio signals based on a user input.

11. The method of claim 10, wherein the user input is received through a graphical user interface of the playback device.

12. The method of claim 9, wherein the tracking data is generated based on one or more sensors of the capture device, the sensors including one or more of the following: a camera, a set of microphones, a gyroscope, an accelerometer, and a GPS receiver.

13. The method of claim 9, further comprising defining or modifying a playback level of the one or more ambience audio signals based on a) a speech to noise ratio, b) a content type, or c) a detected noise in a playback environment.

14. The method of claim 9, wherein the primary speech signal is played directly through the plurality of speakers without spatialization.

15. An article of manufacture comprising: a non-transitory machine readable medium having stored therein instructions that, when executed by a processor of an audio capture device, cause the audio capture device to perform the following:
  receiving a plurality of audio signals from a plurality of microphones that capture a sound field;
  processing the audio signals into a plurality of frequency domain signals;
  extracting, from the frequency domain signals, a primary speech signal;
  extracting, from the frequency domain signals, one or more ambience audio signals;
  generating one or more spatial parameters defining spatial characteristics of ambience in the one or more ambience audio signals, wherein the one or more spatial parameters include a location of an ambience sound source;
  detecting a location or an orientation of the audio capture device, as tracking data;
  modifying the one or more spatial parameters based on the tracking data by offsetting a relative movement of the ambience sound source caused by a change in the location or orientation of the audio capture device, to maintain a location of the ambience sound source constant during playback; and
  encoding the primary speech signal, the ambience audio signals, and the spatial parameters into one or more encoded data streams.

16. An article of manufacture comprising: a non-transitory machine readable medium having stored therein instructions that, when executed by a processor of a playback device, cause the playback device to perform the following:
  receiving from a capture device one or more encoded data streams;
  decoding the one or more encoded data streams to extract a primary speech signal, one or more ambience audio signals representing an ambience sound source, and one or more spatial parameters that describe a spatial characteristic of the one or more ambience audio signals including a location of the ambience sound source;
  modifying the spatial parameters of the one or more ambience audio signals based on tracking data received in and decoded from the encoded data streams, the tracking data including a location or orientation of the capture device, by offsetting a relative movement of the ambience sound source caused by a change in the location or orientation of the capture device, to maintain a location of the ambience sound source constant during playback;
  determining, based on the one or more spatial parameters, one or more impulse responses;
  convolving each of the one or more ambience audio signals with the one or more impulse responses resulting in spatialized ambience audio signals;
  processing the spatialized ambience audio signals and the primary speech signal to produce a plurality of time domain channel signals; and
  driving a plurality of speakers based on the plurality of time domain channel signals.

* * * * *